(12) United States Patent
Goetz et al.

(10) Patent No.: US 11,620,866 B1
(45) Date of Patent: Apr. 4, 2023

(54) SYSTEMS AND METHODS FOR EXECUTING A TRANSACTION VIA A LOCKER

(71) Applicant: Wells Fargo Bank, N.A., San Francisco, CA (US)

(72) Inventors: Darren M. Goetz, Salinas, CA (US); Chris Kalaboukis, San Jose, CA (US); Lisa R. Magana, San Francisco, CA (US); Andrew L. Martinez, San Francisco, CA (US); Uma Meyyappan, Freemont, CA (US); Dennis E. Montenegro, Concord, CA (US); Marla M. Pacis, Daly City, CA (US); Timothy R. Ward, Mesa, AZ (US)

(73) Assignee: Wells Fargo Bank, N.A., San Francisco, CA (US)

(*) Notice: Subject to any disclaimer, the term of this patent is extended or adjusted under 35 U.S.C. 154(b) by 190 days.

(21) Appl. No.: 16/156,701

(22) Filed: Oct. 10, 2018

(51) Int. Cl.
G07C 9/00 (2020.01)
G06Q 20/40 (2012.01)
G06V 20/00 (2022.01)

(52) U.S. Cl.
CPC ..... G07C 9/00912 (2013.01); G06Q 20/4014 (2013.01); *G06V 20/00* (2022.01)

(58) Field of Classification Search
CPC . G06Q 10/0836; G06Q 30/00; G06K 9/00671
See application file for complete search history.

(56) References Cited

U.S. PATENT DOCUMENTS

| | | | | |
|---|---|---|---|---|
| 9,424,702 | B2* | 8/2016 | Ogishi | G07C 9/00912 |
| 9,495,705 | B2* | 11/2016 | Blachowicz | G06Q 10/0832 |
| 10,019,771 | B2* | 7/2018 | Ahmed | G06Q 50/30 |
| 10,242,263 | B1* | 3/2019 | Singh | G06K 9/00671 |
| 10,387,882 | B2* | 8/2019 | Hagen | G06Q 20/4016 |
| 10,437,435 | B2* | 10/2019 | Ladden | G06T 7/0004 |
| 10,572,946 | B2* | 2/2020 | Bowles | G06Q 10/30 |
| 10,643,415 | B2* | 5/2020 | Fee | G06Q 10/0836 |
| 10,970,549 | B1* | 4/2021 | Krishnan | G06K 9/00671 |
| 11,062,287 | B2* | 7/2021 | Artman | H05K 999/00 |
| 2002/0152174 | A1* | 10/2002 | Woods | G06Q 10/08 705/60 |
| 2003/0222760 | A1* | 12/2003 | Hara | G07F 17/0042 340/5.73 |
| 2005/0251473 | A1* | 11/2005 | Viviani | G06Q 20/04 705/39 |

(Continued)

FOREIGN PATENT DOCUMENTS

WO WO2018022569 * 2/2018 ............ G06Q 10/00

*Primary Examiner* — Daniel S Felten
(74) *Attorney, Agent, or Firm* — Foley & Lardner LLP

(57) ABSTRACT

Disclosed herein are systems and methods for executing a transaction via a locker. A seller is provided initial access to the locker to deposit a good in the locker. The seller deposits the good in the locker. Following the seller depositing the good in the locker, the seller's access is revoked, and the buyer is provided access to the locker. The buyer may then arrive at the locker and provide authentication information to an authentication device. When the buyer is authenticated, the locker door (with the good inside the locker) is unlocked. The buyer can then inspect and accept the good. When the good is accepted, funds may be transferred from an account associated with the buyer to an account associated with the seller.

20 Claims, 6 Drawing Sheets

(56) References Cited

U.S. PATENT DOCUMENTS

| | | | |
|---|---|---|---|
| 2012/0265651 A1* | 10/2012 | Ephraim | G06Q 30/0623 |
| | | | 705/27.2 |
| 2015/0356502 A1* | 12/2015 | Agasti | H04W 4/02 |
| | | | 705/339 |
| 2017/0132594 A1* | 5/2017 | Morgan | G06Q 30/0226 |
| 2018/0033235 A1* | 2/2018 | Dotterweich | G07C 9/00896 |
| 2018/0075419 A1* | 3/2018 | Just | G06Q 20/40 |

* cited by examiner

TRANSACTION NO. XYZ123

Buyer Account Information: ********************

Seller Account Information: ********************

Transfer Amount: $100.00

Good to be transferred: Watch

Good Verified? [X] Yes [ ] No

Appraisal Selected? [X] Yes [ ] No

Appraisal Completed? [X] Yes [ ] No

Current Locker Access State

Buyer [X]

Seller [ ]

Appraiser [ ]

FIG. 4

SYSTEMS AND METHODS FOR EXECUTING A TRANSACTION VIA A LOCKER

BACKGROUND

The present disclosure relates generally to transfers of goods. More specifically, the present disclosure relates to a secure transfer of goods between a buyer and seller.

As commerce expands, more person-to-person exchanges of goods may occur. For instance, many person-to-person commerce marketplaces currently exist. Some examples of such marketplaces include Craigslist®, Facebook® Marketplace, eBay®, etc. Each of these marketplaces provides a way for a buyer and seller to exchange a good for an agreed-upon price. Typically, the buyer and seller are required to meet to exchange the goods, or are required to mail/ship the goods. Where the buyer and seller meet, such an in-person meeting may be unsafe. Additionally, where the seller ships the goods to the buyer, the buyer may not actually pay for the goods. Thus, current marketplaces are not secure in that payment is not necessarily guaranteed, and sellers/buyers may not necessarily be safe during in-person meetings.

SUMMARY

According to one aspect of the disclosure, a method of executing a transaction via a locker is described. The method includes providing, to a seller, access to a locker for depositing a good in the locker. The good may be transferred from the seller to a buyer in accordance with an agreed-upon transaction between the buyer and the seller. The method includes detecting the seller deposited the good in the locker. The method includes, responsive to detecting the seller deposited the good in the locker, revoking, from the seller, access to the locker, and providing, to the buyer, access to the locker for accepting the good in the locker. The method includes authenticating, at the locker, a user as the buyer responsive to the user providing buyer authentication information to the authentication device. The method includes automatically unlocking the locker responsive to the user being authenticated as the buyer. The method includes determining the buyer accepted the good from the locker. The method includes, responsive to determining the buyer accepted the good from the locker, automatically initiating a transfer of funds from an account associated with the buyer to an account associated with the seller.

According to another aspect of the disclosure, a system for executing a transaction via a locker is described. The system includes a locker having a storage space for storing a good to be transferred from a seller to a buyer and a locker door for securing the storage space. The system includes a locking device selectively locking the locker door. The system includes an authentication device communicably coupled to the locking device. The authentication device is configured to control the locking device to selectively secure the storage space based on authentication information received at the authentication device. The system includes a processing circuit including a processor and memory. The memory is structured to store instructions that, when executed by the processor, cause the processor to detect the seller deposited the good in the storage space for the locker. The memory is further structured to store instructions to, responsive to detecting the seller deposited the good in storage space for the locker, revoke, from the seller, access to the locker, and provide, to the buyer, access to the locker for accepting the good in the locker. The memory is further structured to store instructions to authenticate, at the locker, a user as the buyer responsive to the user providing buyer authentication information to the authentication device. The memory is further structured to store instructions to control, by the authentication device, the locking device to unlock the locker door of the locker responsive to the user being authenticated as the buyer. The memory is further structured to store instructions to determine the buyer accepted the good from the locker. The memory is further structured to store instructions to, responsive to determining the buyer accepted the good from the locker, automatically initiate a transfer of funds from an account associated with the buyer to an account associated with the seller.

BRIEF DESCRIPTION OF THE DRAWINGS

FIG. 4 shows example transaction information maintained by the locker control system of FIG. 1, according to an exemplary embodiment.

DETAILED DESCRIPTION

Figure 1:
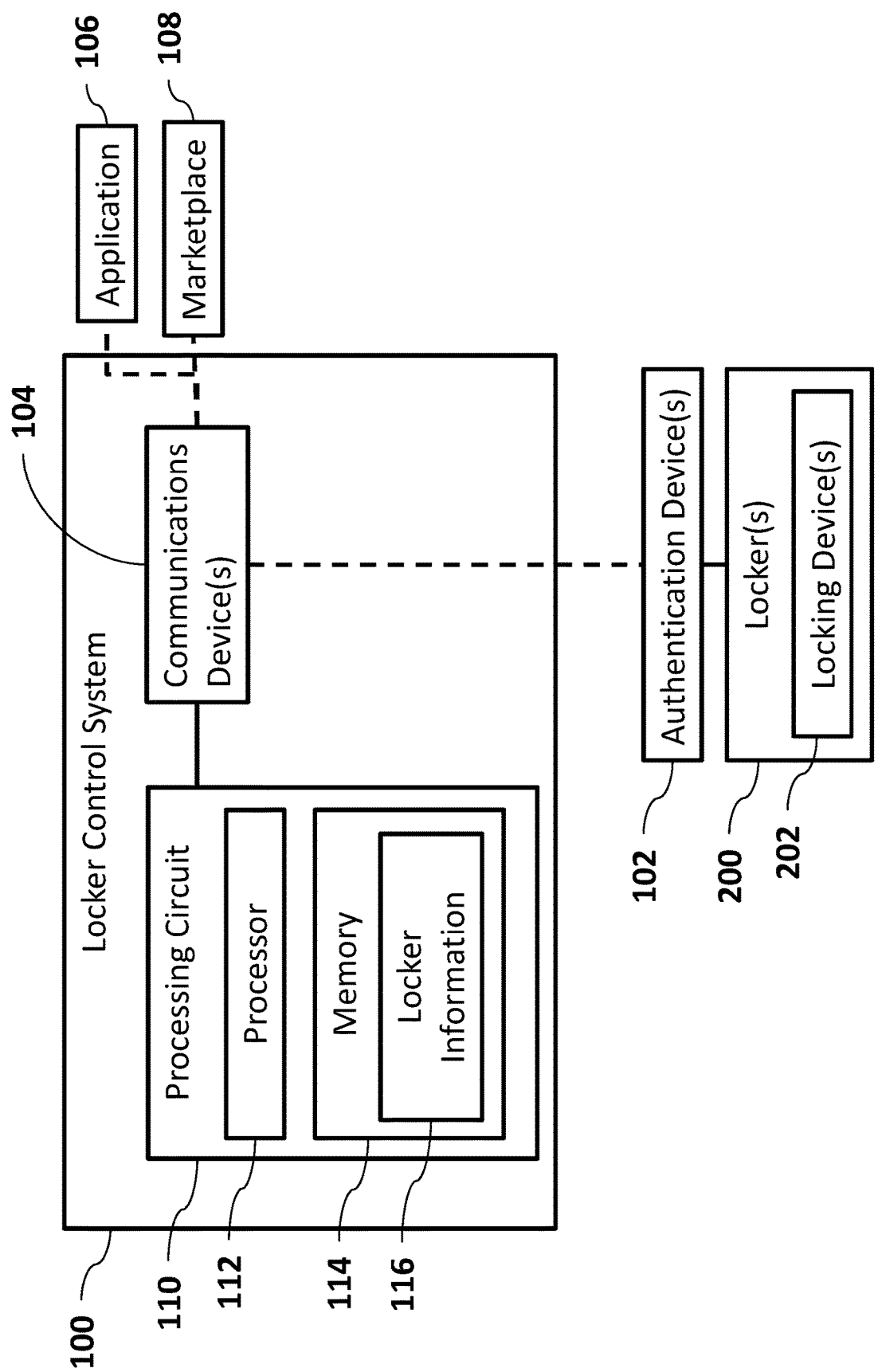
FIG. 1 shows a locker control system, according to an exemplary embodiment.

Referring generally to the figures, systems and methods for executing a transaction via a locker are described. A locker includes a storage space for storing various goods that may be sold from sellers to buyers. The locker also includes a locker door for securing the storage space including the contents thereof (e.g., the various goods). The locker also includes a locking device for selectively locking the locker door. An authentication device is communicably coupled to the locking device. The authentication device is configured to control the locking device to selectively secure the storage space based on authentication information received at the authentication device.

A seller is provided initial access to the locker. The seller may deposit a good to be transferred from the seller to a buyer in the storage space and shut the locker door. When the seller deposits the good in the storage space, the seller's access to the locker may be revoked, and the buyer may be provided access to the locker for accepting the good in the locker. A user (which may or may not be the buyer) may provide buyer authentication information to an authentication device. The user may be authenticated (e.g., by the authentication device) as the buyer based on the buyer authentication information provided by the user to the authentication device. The authentication device may control the locking device to unlock the locker door to provide the seller access to the storage space. The buyer may inspect (and ultimately accept or reject) the good from the storage space. Once the buyer has accepted the good from the locker, funds may be transferred from an account associated with the buyer to an account associated with the seller.

The arrangements described herein may facilitate transferring goods between a buyer and a seller via a locker control system and corresponding authentication devices at various locker banks. As opposed to existing methods for exchanging of goods, the arrangements described herein provide an anonymous exchange. For instance, a seller may deposit a good in a locker dedicated for exchanging a good from the seller to the buyer. The seller may shut the locker door and leave. The buyer may then arrive at the locker, authenticate themselves (e.g., via the authentication device), open the locker door and accept the goods. Thus, the seller and buyer are provided access to the locker at different steps or stages of the transaction workflow, effectively separating the buyer and seller throughout the transaction and eliminating buyer-seller interactions. In many traditional exchanges, a buyer may not be acquainted with a seller. However, the buyer may be required to meet the seller to exchange the goods. In some instances, such a meeting may be unsafe or dangerous to the buyer and/or seller. The embodiments described herein eliminate the risks associated with meeting unknown parties to exchange goods. Rather, sellers deposit goods in a secure locker. Buyers are authenticated, given access to, and can accept the goods from the secure locker.

According to some embodiments, the goods may be appraised or otherwise evaluated by one or more third parties. For instance, the buyer and/or seller may request an appraisal of the goods prior to completing the exchange. A third party may be identified, authenticated, and given access to the secure locker following the seller depositing the goods in the secure locker. The third party may appraise (or otherwise evaluate the goods). Following the third party appraising the goods, the buyer may be provided the results of the appraisal. Additionally, the buyer may be given access to the secure locker to accept the goods.

According to some embodiments, the locker(s) may be operated by a financial institution. The financial institution may act as an escrow agent to the buyer/seller. For instance, the financial institution may receive and/or identify account information for the buyer and seller. Once the buyer accepts the goods, the financial institution may initiate a transfer of funds from the account for the buyer to the account for the seller. Such embodiments may increase the likelihood of payment, guarantee payment, etc.

The arrangements described herein provide various technical solutions to problems and shortcomings of existing exchange of goods scenarios. For example, the arrangements described herein may increase security of the buyer and seller by separating the two parties during the transaction. Specifically, the buyer (e.g., and no other person(s) or parties of the exchange) may only have access to the locker once the goods are deposited by the seller. Additionally, the arrangements described herein may ensure payment for the goods. Specifically, the financial institution may automatically initiate payment once the buyer accepts the goods. Various other benefits of the disclosed systems and methods may become apparent according to the following disclosure.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Figure 2:
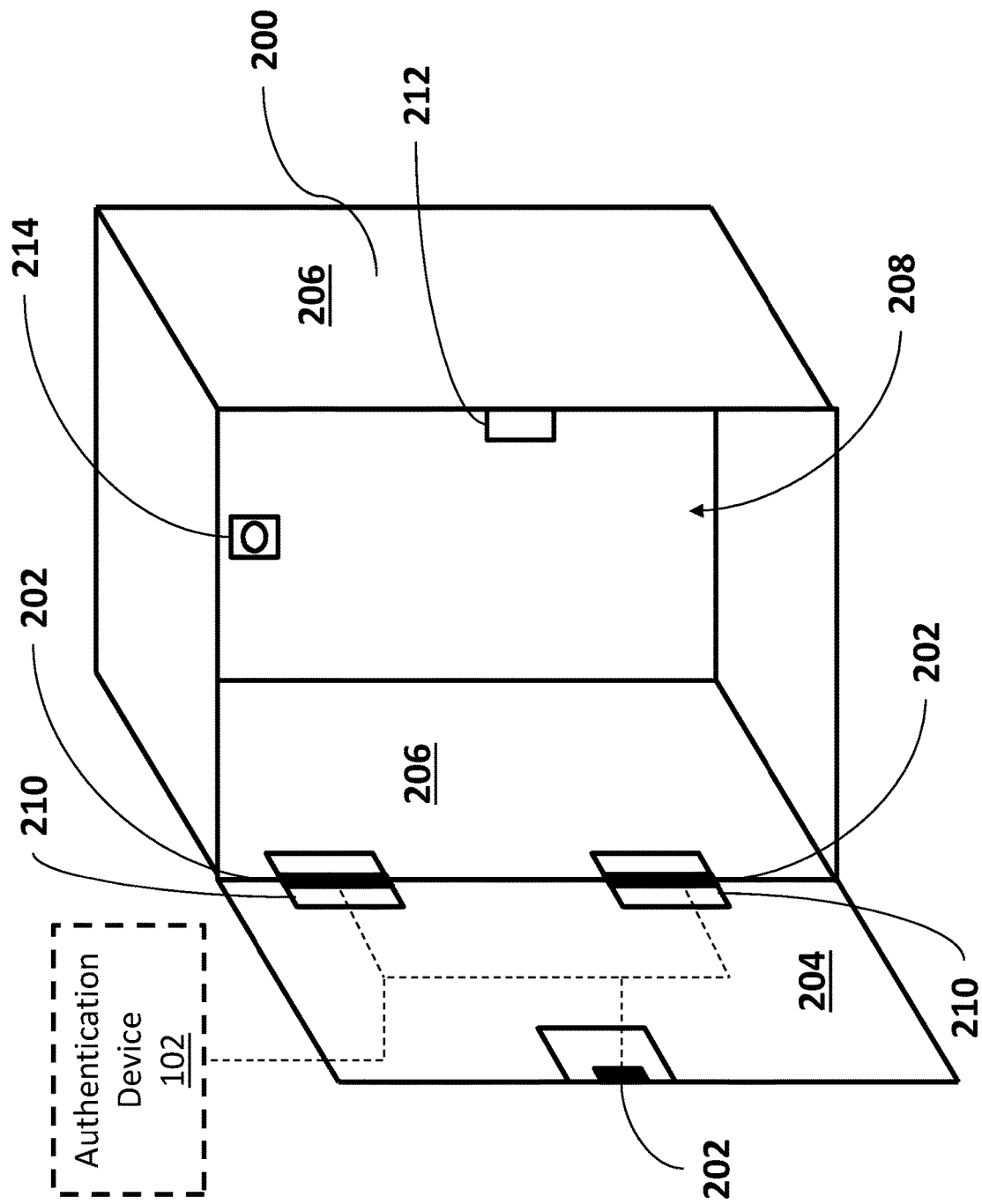
FIG. 2 shows an example locker controlled by the locker control system of FIG. 1, according to an exemplary embodiment.

Referring now to FIG. 1 and FIG. 2, a locker control system 100 and lockers 200 are shown, according to exemplary embodiments. Specifically, FIG. 1 shows a locker control system 100, and FIG. 2 shows an example locker 200 controlled by the locker control system 100, according to exemplary embodiments. The locker control system 100 may be communicably coupled to a number of lockers 200. In some embodiments, the locker(s) 200 may be separated over a distance. For instance, several locker(s) 200 may be located at one location, some locker(s) 200 may be located at another location, etc. Locker(s) 200 at a particular location may be grouped together (e.g., several locker(s) 200 may together form a locker bank). In some embodiments, locker(s) 200 may be located at a financial institution. In this regard, the locker(s) 200 may be managed and controlled by a particular financial institution. In other embodiments, the locker(s) 200 may be located at other locations, and thus may be managed and controlled by other institutions or entities.

Each locker 200 may include a respective locking device 202. The locking device 202 may be an electronic or electrically controlled lock. In some embodiments, the locking device 202 may be a magnetic lock, an electronic lock, etc. The locking device 202 may be configured to lock a locker door 204 for the respective locker 200. The locking device 202 may be located on and coupled to the locker door 204. In some embodiments, the locking device 202 may selectively engage one or more walls 206 of the locker 200 to prevent opening of the locker door 204 (and thus accessing the storage space 208 for the locker 200). For instance, the locking device 202 may engage one or more walls 206 of the locker 200 at a joint 210 between the wall 206 and the locker door 204. In this regard, the joint 210 between the wall 206 and locker door 204 may be "loaded" by the locking device 202 such that the joint 210 may freely pivot when the locking device 202 is in an unlocked state. In some instances, the locking device 202 may be located on the door 204 and include a locking mechanism (such as a deadbolt, for instance) that extends into a receiver 212 located on or near an interior wall 206. In each of these embodiments, the locking device 202 may be configured to selectively lock and unlock the locker door 204 and thus prevent (or permit) access to the internal storage space 208 for the locker 200.

Each locker 200 may be controlled by a respective authentication device 102. The authentication device 102 may be a device located at or near a locker 200 (or group of lockers 200). The authentication device 102 may be a computer, tablet, etc. The authentication device 102 may include one or more input devices configured to receive authentication information for a user. In some embodiments, the authentication device 102 is configured to receive authentication information for a user from another device, such as a smartphone of the user. The authentication device 102 may be communicably coupled to the locking device 202. The authentication device 102 may be configured to selectively lock and unlock the locking device 202. The authentication device 102 may control the locking device 202 to unlock the locker door when a user is authenticated as having access to the locker 200, as discussed in greater detail below. In some embodiments, the authentication device 102 may be in a closed loop relationship with the locking device 202. Such embodiments may prevent or inhibit malicious access and control of the locking device 202.

In some embodiments, the authentication device 102 may control a group of lockers 200. For instance, a group of lockers 200 at a particular location may have a single authentication device 102. In other embodiments, each locker 200 may include a dedicated authentication device 102 (e.g., one authentication device 102 is provided for each locker 200). In each of these embodiments, a respective locker 200 may be controlled by a respective authentication device 102 and, in some embodiments, an authentication device 102 may control a single locker 200 (e.g., one authentication device 102 to one locker 200).

The locker control system 100 may include one or more communications devices 104. The communications device(s) 104 can be or include components configured to transmit and/or receive data from one or more remote sources. Each of the communications device(s) 104 may permit or otherwise enable data to be exchanged between the various user(s) (via their corresponding user devices) and the locker control system 100. The communications device 104 may communicate with various user devices via a network. The network may be a Local Area Network (LAN), a Wide Area Network (WAN), a Wireless Local Area Network (WLAN), an Internet Area Network (IAN), a cloud-based network, etc. In some implementations, the communications device(s) 104 may access the network to exchange data with various other communications device(s) via cellular access, a modem, broadband, Wi-Fi, satellite access, etc.

The locker control system 100 may receive a request (e.g., from a user) to use a locker 200 for exchanging goods between a buyer and a seller. According to some embodiments, the request may be manually transmitted from the user to the locker control system 100. In some embodiments, the user may use an application 106 associated with the locker(s) 200. For instance, where the locker(s) 200 are controlled and managed by a financial institution, the user may use an application 106 associated with the financial institution. The application 106 may be a mobile application (e.g., an application installed on a user device for the user), a web-based application, a website or webpage, etc. In some embodiments, the request may be received from a marketplace 108 following a buyer agreeing to purchase a good on the marketplace 108. The locker control system 100 may be communicably coupled to a particular marketplace 108 (e.g., via an application programming interface (API) for the marketplace 108). Various examples of marketplaces 108 include eBay®, Craigslist®, Facebook® Marketplace, Amazon®, etc. The marketplace 108 may generate a request for accessing a locker 200 responsive to a buyer agreeing to purchase a good sold by a seller. In each of these embodiments, the application 106 and/or the marketplace 108 may be communicably coupled to the communication device 104.

The request may include various information corresponding to the transaction. For instance, the request may include information corresponding to the buyer, information corresponding to the seller, and information corresponding to the exchange. As used herein, "transaction" refers to the overall process of transferring the good from the seller to the buyer and transferring funds from the buyer to the seller and information corresponding thereto. "Exchange," as used herein, refers to the specific exchange of the good from the seller to the buyer. The information corresponding to the buyer may include buyer account information, such as a buyer bank account number and routing number, a credit card number, etc. Additionally, the information corresponding to the buyer may include buyer identification information. The information corresponding to the buyer may further include a manner in which the buyer will authenticate him or herself at the authentication device 102 at the locker(s) 200. The information corresponding to the seller may include seller account information, such as a seller bank account number and routing number, a credit card number, etc. Additionally, the information corresponding to the seller may include seller identification information. The information corresponding to the seller may further include a manner in which the seller will authenticate him or herself at the authentication device 102 at the locker(s) 200. The information corresponding to the exchange may include amount in exchange for the good (e.g., an agreed-upon purchase amount by the buyer for the good(s) sold by the seller). The information corresponding to the exchange may also include a size of the good(s), such as dimensions, weight, etc. The request may further include additional information, such as whether a third party is requested. The third party may be an appraiser of the good(s), an inspector of the good(s), etc. Additionally, the third party may be a cleaner for the locker 200 following the exchange (e.g., where a good which is exchanged between the buyer and seller may be dirty, scented, etc., and thus the locker 200 may require cleaning). The third party may be expressly indicated as being needed by the buyer (or seller), or the third party may be needed based on the goods sold (e.g., over a predetermined amount of money, based on the type of good, based on state or local laws, etc.).

In each of these embodiments, the information corresponding to the request may be communicated with the request from the application 106 and/or marketplace 108 to the locker control system 100. The application 106 and/or marketplace 108 may be communicably coupled to the communications device(s) 104 via a network, such as one or more of the networks described above with reference to the communications device(s) 104. Thus, the locker control system 100 may be configured to receive the request (and corresponding information) from the application 106 and/or marketplace 108.

The locker control system 100 may include one or more circuits. The locker control system 100 may include a processing circuit 110. As will be discussed in further detail below, the circuits may include one or more processors 112 communicably coupled to one or more memory 114 or memory devices. The processors 112 may execute instructions stored in the memory 114 (or otherwise accessible to the processors 112).

Figure 3:
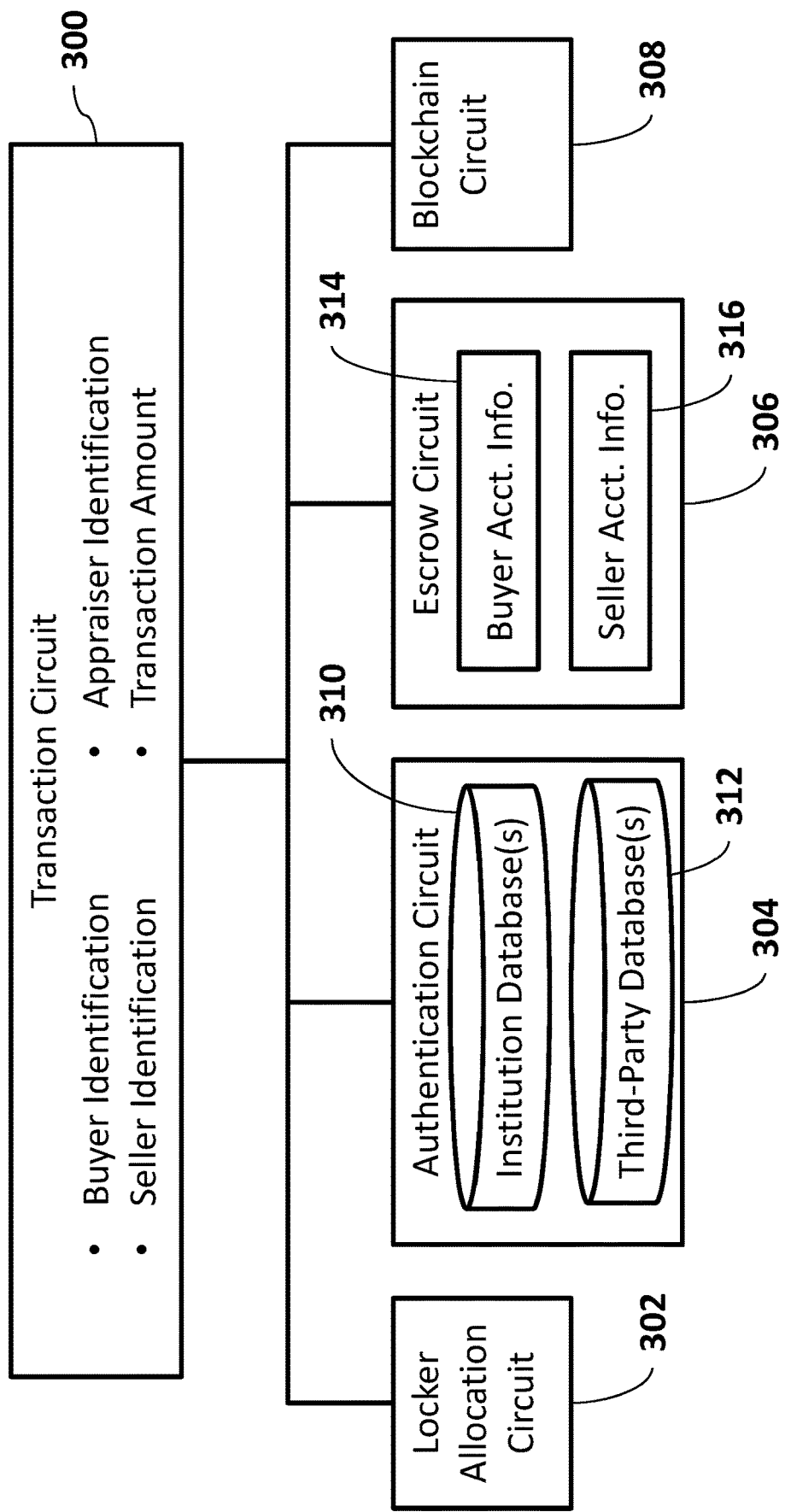
FIG. 3 shows a circuit block diagram for the locker control system of FIG. 1, according to an exemplary embodiment.

Referring now to FIG. 1 and FIG. 3, the locker control system 100 may include one or more additional circuits. Specifically, FIG. 3 shows a circuit block diagram for the locker control system 100, according to an exemplary embodiment. In some embodiments, the circuits shown in FIG. 3 may be included in the processing circuit 110. In other embodiments, the circuits shown in FIG. 3 may be separate from the processing circuit 110. In still other embodiments, the circuits shown in FIG. 3 may be communicably coupled to, and thus work in conjunction with, the processing circuit 110.

The locker control system 100 may include a transaction circuit 300, a locker allocation circuit 302, an authentication circuit 304, an escrow circuit 306, and/or a blockchain circuit 308. Each of these circuits may be responsible for performing various functions to which the respective circuits correspond. For instance, the transaction circuit 300 may perform various functions corresponding to receiving and processing the request and maintaining various data corresponding to given transactions. The locker allocation circuit 302 may perform various functions corresponding to selecting a locker 102 for use. The authentication circuit 304 may perform various functions corresponding to authenticating various users who provide authentication information to an authentication device 102. The escrow circuit 306 may perform various functions corresponding to transferring funds from the buyer to the seller. The blockchain circuit 308 may perform various functions for tracking and maintaining various records corresponding to the good exchanged from the seller to the buyer. While each of these circuits is shown as separate, in some embodiments, at least some of these circuits may be combined into a single circuit, which may be implemented within the locker control system 100 and/or outside of the locker control system 100 (such as within the authentication device 102).

In some embodiments, the transaction circuit 300 may receive the request (and corresponding information) from the communications device(s) 104. Thus, the transaction circuit 300 may receive the request (and corresponding information) from the application 106 and/or marketplace 108 via the communications device(s) 104. The transaction circuit 300 may process the request to identify various information contained in (or corresponding to) the request to use the locker(s) 200. The transaction circuit 300 may identify buyer identification information, seller identification information, and exchange information (such as the agreed-upon amount in exchange for the good). The buyer identification information may be information which is used to subsequently authenticate the buyer. Similarly, the seller identification information may be information which is used to subsequently authenticate the seller. Such information may be used for tracking the status of the transaction. In some embodiments, the buyer and seller identification information may include buyer and seller locations (e.g., current location as detected by a sensor [such as a GPS] in a user device for the buyer/seller, a home address, a zip code, etc.). Such information may be used for selecting a locker for use by the buyer and seller, as described below.

Referring now to FIG. 3 and FIG. 4, the transaction circuit 300 may include or maintain data that corresponds to the information contained in the request. Specifically, FIG. 4 shows example transaction information maintained by the transaction circuit 300 of the locker control system 100, according to an exemplary embodiment. As shown, the transaction circuit 300 may include (or generate, create, etc.) a transaction number. The transaction circuit 300 may also maintain the buyer account information, seller account information, transfer amount, and the type of good to be transferred. The transaction circuit 300 may also maintain information corresponding to a current status of the transaction, as discussed in greater detail below. For instance, the transaction circuit 300 may maintain information corresponding to whether the buyer and/or seller requested (or state/local laws require) an appraisal, inspection, or other verification of one or more aspects of the goods. Where an appraisal (or similar verification of one or more aspects of the goods) was requested, such request may be reflected in the transaction information. Additionally, the appraisal status may also be reflected (e.g., whether or not the appraisal has occurred).

Referring back to FIG. 3, the locker allocation circuit 302 may perform various functions corresponding to selecting a locker 102 for use by the buyer and seller. The locker allocation circuit 302 may identify the location of the buyer and seller. As stated above, the request received via the communications device(s) 104 and processed by the transaction circuit 300 may include buyer and seller identification information, which may include location information, such as current location for the buyer/seller, addresses, zip codes, etc. The locker allocation circuit 302 may identify the buyer and seller location from the location information provided in the request (e.g., by the application 106 and/or marketplace 108). In some embodiments, the memory 114 for the locker control system 100 may store locker information 116. The locker information 116 may be or include various information pertaining to lockers 200 controlled by the locker control system 100 and used for selecting available lockers 200. The locker information 116 may include a schedule corresponding to each locker 200 (e.g., whether the lockers are generally available or already being used). The locker information 116 may include a location of each locker 200 (e.g., a latitude/longitude, an address, etc.). The locker information 116 may also include details pertaining to the size of the locker 200, such as dimensions, opening size, volumetric storage information, etc. Each of these types of information may be used for selecting a locker 200 from each locker 200 in the network (e.g., in the group of lockers 200 controlled by the locker control system 100).

The locker allocation circuit 302 may execute a number of rules for selecting a locker for conducting the exchange. In some embodiments, the rules may have a hierarchy. For instance, a first rule executed by the locker allocation circuit 302 may be a rule for selecting a locker 200 based on the size of the good to be exchanged from the seller to the buyer in comparison with the size of the locker 200. The locker allocation circuit 302 may identify the dimensions of the good to be exchanged (based on the data provided by the seller in the request, or based on the data from the marketplace 108). The locker allocation circuit 302 may determine which lockers 200 (or a general locker 200 size) would be suitable for satisfying the request. In some embodiments, the locker 200 network may include different size lockers 200. The locker allocation circuit 302 may determine which size locker 200 the good would fit in based on the dimensions for the good and the dimensions for the locker 200 (e.g., opening size, volumetric storage, depth and height, etc.). Thus, the locker allocation circuit 302 may determine what size locker 200 is needed for satisfying the request.

The locker allocation circuit 302 may execute a second rule to determine a location of a locker 200 which would be suitable for the buyer and seller. The locker allocation circuit 302 may determine the suitable location for the locker 200 based on the location of the buyer and the location of the seller. For instance, the locker allocation circuit 302 may determine the nearest location of locker(s) 200 to a center between the location of the buyer and the location of the seller. In other instances, the locker allocation circuit 302 may determine the nearest location of locker(s) 200 to the buyer. In still other instances, the locker allocation circuit 302 may determine the nearest location of locker(s) 200 to the seller. In each of these instances, the locker allocation circuit 302 may generally determine a location for the locker(s) 200 based on the location of the buyer and/or seller. In some embodiments, the buyer and/or seller may indicate a preferred location for a locker 200. Such an indication may be prioritized and/or considered in allocating a locker 200 to the buyer and seller. For instance, the locker allocation circuit 302 may select that preferred location and, as described below, should locker(s) 200 at that location not be available, the locker allocation circuit 302 may select other locations nearest to the preferred location.

The locker allocation circuit 302 may execute a third rule to evaluate the schedule for the locker(s) 200 at the location (e.g., from execution of the second rule) having the size needed for fulfilling the request (e.g., from execution of the first rule). The locker allocation circuit 302 may identify the schedule for each locker 200 at the location that fits the constraints identified via execution of the first and second rule. The locker allocation circuit 302 may determine whether any lockers 200 are available based on the identified schedule. Where a locker 200 that fits the constraints is available, the locker 200 may be reserved for the buyer/seller. If a locker 200 is not available, the locker allocation circuit 302 may re-execute the second rule and disregard the location identified at the first instance. Thus, the locker allocation circuit 302 may iteratively execute the second and third rules until the locker allocation circuit 302 identifies a locker 200 that satisfies the constraints and is available.

Once a locker 200 is available and reserved for the buyer and seller, the buyer and seller may each receive a notification indicating the locker 200 location. The notification to the buyer and the notification to the seller may be the same (e.g., the notification may just provide the location of the locker 200 to use for the exchange). In other embodiments, the notification to the buyer and seller may be different (e.g., the notification may provide the location of the locker 200 to use for the exchange and additional information, as described below).

When the locker is reserved, the seller may be provided access to the locker 200. Such access may be reflected as the current locker access state within the transaction information maintained by the transaction circuit 300 (e.g., shown in FIG. 4). The seller may be provided access to the locker 200 and the buyer (and any other parties to the transaction) may not be provided access to the locker 200. In this regard, the seller may be provided sole access to the locker 200. The seller may receive a notification that indicates the seller has access to the locker 200 for depositing the good in the locker 200. The seller may arrive at the location of the locker 200 to deposit the good in the locker 200. Prior to the seller being able to open the locker 200, the seller may authenticate themselves via the authentication device 102. Accordingly, where a party is provided access to the locker 200, the party has the ability to open the locker door 204 when the party is properly authenticated, as described in greater detail below.

In some embodiments, the seller may provide the type of authentication information which is to be used for authenticating the seller. For instance, the seller may indicate that the seller plans to authenticate themselves via log-in credentials associated with an account for the financial institution. As described in greater detail below, such log-in credentials may be retrieved in real-time (e.g., when the seller provides such log-in credentials at the authentication device 102) or prior to the seller arriving at the authentication device 102. Where the seller provides the type of authentication information which is to be used for authenticating the seller, the manner in which the seller is authenticated can be authenticated in of itself, which may add an additional security measure.

Figure 5:
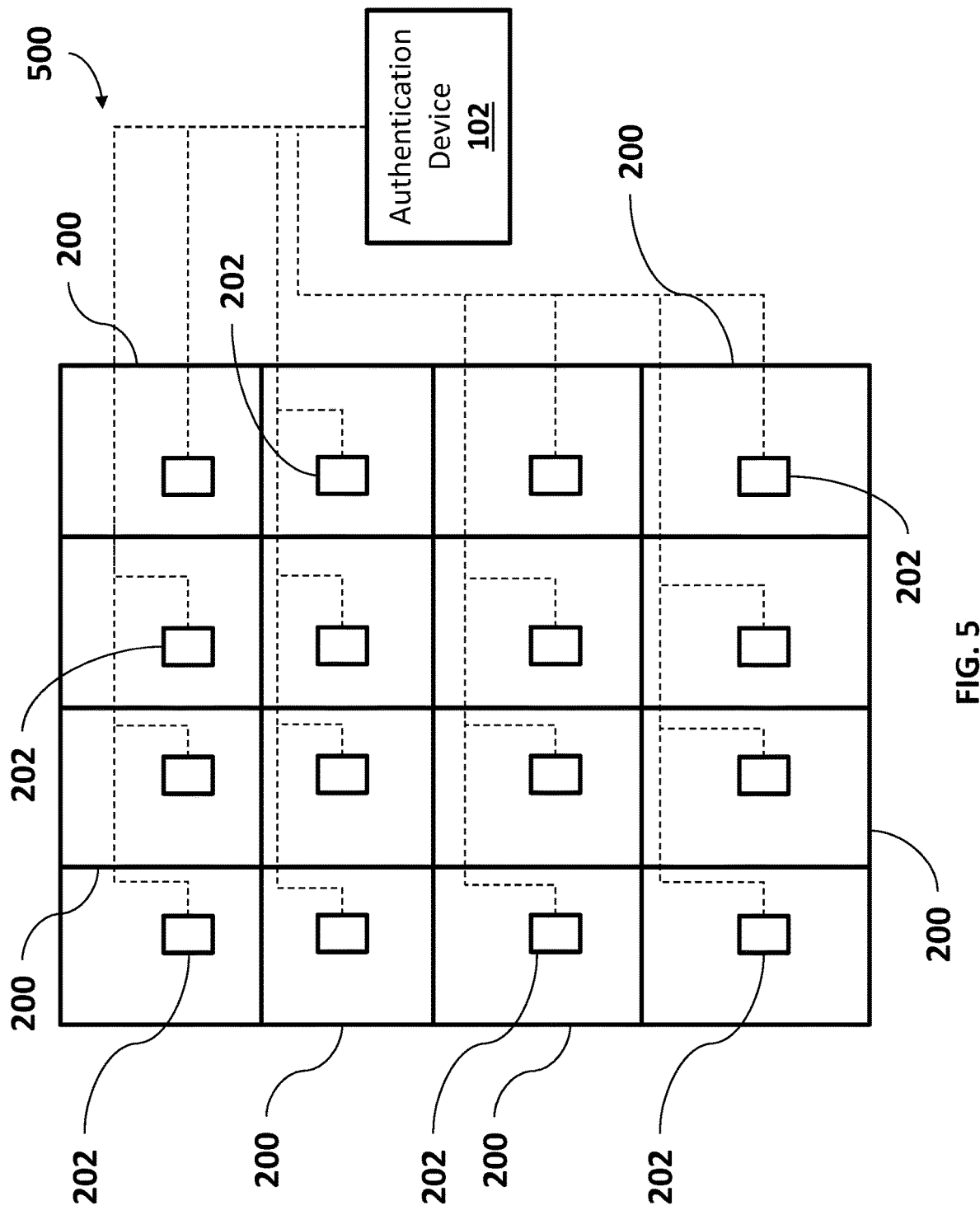
FIG. 5 shows a locker bank including a plurality of lockers of FIG. 2, according to an exemplary embodiment.

Referring now to FIG. 3 and FIG. 5, the locker control system 100 may further include an authentication circuit 304. Specifically, FIG. 5 shows a locker bank 500 including a plurality of lockers 200, according to an exemplary embodiment. In some embodiments, the authentication circuit 304 may be located or embodied on the authentication device 102. In other embodiments, the authentication circuit 304 may be separate from but operate in conjunction with the authentication device 102. The authentication circuit 304 may access or include various databases including authentication information. Such authentication information may be used for authenticating the buyer and seller (and any third parties). As described above, the authentication device 102 may be communicably coupled to the locking device 202 for the locker 200. When a user is authenticated as the buyer/seller and the buyer/seller has access to the locker 200, the authentication device 102 may control the locking device 202 to unlock the locker door 204.

The locker control system 100 (e.g., the authentication circuit 304) may authenticate users in a number of different ways. Several examples of ways in which the authentication circuit 304 may authenticate the user will now be described. However, the present disclosure is not limited to any particular authentication method. In some embodiments, the manner in which the buyer and/or seller will authenticate themselves at the authentication device 102 may be provided by the buyer/seller prior to authentication (e.g., within the request, in response to the notification indicating the buyer/seller access). Such embodiments may add an additional layer of security by authenticating the authentication manner. The authentication circuit 304 may retrieve, receive, or otherwise access the seller/buyer identification information used for authenticating the seller/buyer prior to a user providing authentication information at the authentication device 102, when the user provides authentication information at the authentication device 102, etc.

According to some embodiments, a user may authenticate themselves using institution website, application, etc. log-in information. The user may have an account with a financial institution (e.g., the financial institution that controls or manages the locker(s) 200). The user may provide their log-in information to the authentication device 102 (e.g., a username and password). The authentication circuit 304 may include or access one or more institution database(s) 310 which store or are configured to store log-in information for various users having accounts with online access. The authentication circuit 304 may compare the log-in information provided with the user to log-in information associated with the seller. Where the log-in information provided by the user and the log-in information associated with the seller matches, the authentication circuit 304 may authenticate the user as the seller. The authentication circuit 304 may control the authentication device 102 (or the locking device(s) 202 directly) to unlock the locker door 204 to provide access to the storage space 208 for the locker 200.

According to other embodiments, a user may authenticate themselves using an automated teller machine (ATM) card, credit card, and/or debit card. The user may have an account with a financial institution (e.g., the financial institution that controls or manages the locker(s) 200, or a different financial institution). The user may insert, swipe, etc. their ATM/credit/debit card to the authentication device 102. The authentication circuit 304 may include or access one or more institution database(s) 310 which store or are configured to store user identification information associated with various ATM cards, credit cards, debit cards, etc. for various users. In embodiments where the card for the user is not with the financial institution managing or otherwise controlling the locker(s) 200, the authentication circuit 304 may access a network of institution databases 310 (similar to current ATM withdrawals when a user doesn't bank with the financial institution managing the ATM). The user identification information may include information used for identifying users (such as a PIN number for an ATM or debit card, a zip code associated with a credit card, etc.), as well as account information. The authentication circuit 304 may compare information used for identifying the user who inserted their ATM card/credit card/debit card to identification information associated with the seller. Where such information matches, the authentication circuit 304 may authenticate the user as the seller. In some embodiments, the user may further be required to provide a PIN associated with the ATM/debit card or a zip code associated with a credit card as an added authentication measure. The authentication circuit 304 may compare the PIN/zip code provided by the user to the PIN/zip code associated with the ATM/credit/debit card. Where the user provided the proper PIN/zip code, the authentication circuit 304 may authenticate the user as the seller. In this regard, the user may be authenticated by providing their ATM/credit/debit card to the authentication device 102. The authentication device 102 may use the ATM/credit/debit card solely for authenticating the user (e.g., not for actually paying for the goods or otherwise transferring funds). The authentication circuit 304 may control the authentication device 102 (or the locking device(s) 202 directly) to unlock the locker door 204 to provide access to the storage space 208 for the locker 200.

According to other embodiments, a user may authenticate themselves using third-party website, application, etc. log-in information. Such third-party log-in information may be or include, for instance, social media (e.g., Facebook®, Google®, Twitter®) account log-in information, marketplace (e.g., Facebook® Marketplace, eBay®, Amazon®) log-in information, or third-party fund transfer (e.g., Venmo®, Apple Pay®, Zelle®) log-in information. The user may provide their third-party log-in information to the authentication device 102 (e.g., a username/email address/phone number and password). For instance, the authentication circuit 304 may route the user to a log-in screen for the third party (e.g., Facebook®, Google®, eBay®, etc.), where the user provides third-party the log-in information. The third party may maintain server(s) or third-party database(s) 310. The third party may verify the log-in information and provide an indication to the authentication circuit 304 verifying the log-in credentials (and identity) provided by the user. As another example, the authentication circuit 304 may include or access one or more third-party database(s) 310 which store or are configured to store log-in information for various user accounts. The authentication circuit 304 may compare the log-in information provided with the user to log-in information associated with the seller. Where the log-in information provided by the user and the log-in information associated with the seller matches, the authentication circuit 304 may authenticate the user as the seller. The authentication circuit 304 may control the authentication device 102 (or the locking device(s) 202 directly) to unlock the locker door 204 to provide access to the storage space 208 for the locker 200.

According to other embodiments, a user may authenticate themselves using their mobile device. For instance, the authentication device 102 may include a near-field communications (NFC) device or similar device configured to exchange data between devices in close proximity. The mobile device may include a unique identifier. The unique identifier may be a PIN, a code, an IP address, etc., which is uniquely associated with the mobile device. The mobile device may also include an NFC transmitter. The user may tap their mobile device on the authentication device 102 (e.g., near the NFC device for the authentication device 102). The NFC transmitter for the mobile device may communicate the unique identifier to the NFC device for the authentication device 102. The authentication circuit 304 may cross-reference the institution database or third-party database to determine whether the mobile device is associated with the seller. Where the unique identifier is associated with the seller, the authentication circuit 304 may authenticate the user as the seller. In some embodiments, the mobile device may communicate the identity (e.g., name, address, etc.) of the user via the NFC transmitter to the NFC device for the authentication device 102. The authentication circuit 304 may compare the data communicated by the mobile device to data associated with the seller to determine whether the user is the seller. In each of these embodiments, the user may tap their mobile device on the authentication device 102 to provide data from the mobile device to the authentication device 102. The data may be used for authenticating the user as the seller. Where the authentication circuit 304 authenticates the user as the seller, the authentication circuit 304 may control the authentication device 102 (or the locking device(s) 202 directly) to unlock the locker door 204 to provide access to the storage space 208 for the locker 200.

According to other embodiments, a user may authenticate themselves using a one-time passcode (e.g., an alpha-numerical passcode, a PIN, etc.). The one-time passcode may be unique to the buyer and seller. The one-time passcode may be communicated to the buyer/seller when the buyer/seller are provided access to the locker 200 (e.g., in the locker access notification communicated to the buyer and seller). Additionally, the one-time passcode may be communicated to the buyer/seller when the locker 200 is reserved (e.g., in separate messages or notifications). The user may provide their one-time passcode to the authentication device 102. The authentication circuit 304 may include or access the one-time passcode associated with the seller (which may be reflected in the transaction information maintained by the transaction circuit 300). The authentication circuit 304 may compare the one-time passcode provided by the user to the one-time passcode associated with the seller. Where the one-time passcode provided by the user and the one-time passcode associated with the seller matches, the authentication circuit 304 may authenticate the user as the seller. The authentication circuit 304 may control the authentication device 102 (or the locking device(s) 202 directly) to unlock the locker door 204 to provide access to the storage space 208 for the locker 200.

In each of the above-described example authentication methods, a user at the locker provides various authentication information to the authentication device 102. The authentication circuit 304 cross-references various data associated with the seller to the authentication information provided by the user. The authentication circuit 304 determines whether the user is the seller based on the information provided by the user. When the authentication circuit 304 authenticates the user as the seller, the locker 200 is unlocked and the seller is provided access to the storage space 208 for the locker 200. In embodiments where the seller provides the manner in which they are authenticating themselves (e.g., in response to the seller receiving the notification indicating they have access to the locker 200, in the request for the locker 200), the authentication circuit 304 may further authenticate the type of authentication used at the authentication device 102 as an added authentication and security measure.

In some embodiments, the transaction circuit 300 may determine or otherwise identify that the seller has deposited the good in the locker 200. The transaction circuit 300 may determine that the seller has deposited the good in the locker 200 by any number of ways, at least some of which are discussed in greater detail below.

As one example, referring briefly back to FIG. 2, the locker 200 may include a camera 214. The camera 214 may be mounted within the locker 200 as shown. Additionally, the camera 214 may be mounted outside of the locker 200, but still may be configured to generate image data corresponding to the storage space 208 for the locker 200. The transaction circuit 300 may be communicably coupled to the camera 214. Where the seller has not deposited the good in the locker 200, the storage space 208 may be empty (and, accordingly, the image generated by the camera 214 may show the empty storage space 208). The transaction circuit 300 may analyze the image generated by the camera 214 to determine whether or not the storage space 208 is empty. When the storage space is not empty based on the analyzed image, the transaction circuit 300 may determine that the seller has deposited the good in the locker 200.

In some embodiments, the transaction circuit 300 may further analyze the image to determine whether the good deposited in the locker 200 matches the good to be exchanged from the seller to the buyer. As described above, the transaction circuit 300 may maintain exchange information including a description of the good to be exchanged. In the example shown in FIG. 4, the good to be exchanged is a watch. The transaction circuit 300 may analyze the good deposited in the locker 200 to determine whether the good is a watch (e.g., via image processing software accessible by the transaction circuit 300). The transaction circuit 300 may verify that the good deposited in the locker 200 fits the description of the good to be exchanged. Where the transaction circuit 300 verifies the good deposited in the locker 200 fits the description of the good to be exchanged, the transaction circuit 300 may update the transaction information to reflect the verification of the good (as shown).

As another example, the locker 200 may include one or more weight sensor(s). The weight sensor(s) may be mounted at or near the base (or floor) of the locker 200 to measure a downward gravitational force on the base of the locker 200. The weight sensor(s) may be calibrated such that, when the locker 200 is empty, the weight sensor(s) return a value which indicates the locker 200 is empty. Where a good is placed in the locker 200, the weight sensor(s) may return a value indicating that something has been deposited in the locker 200. The transaction circuit 300 may be communicably coupled to the weight sensor(s). Where the seller has not deposited the good in the locker 200, the storage space 208 may be empty (and, accordingly, the data generated by the weight sensor(s) may indicate that the storage space 208 is empty). The transaction circuit 300 may analyze data generated by the weight sensor(s) to determine whether or not the storage space 208 is empty. When the storage space is not empty based on the data from the weight sensor(s), the transaction circuit 300 may determine that the seller has deposited the good in the locker 200.

As still another example, the locker 200 may include one or more position sensors. The position sensor(s) may be mounted within the joint(s) 210, at the juncture between the wall 206 and the locker door 204, within the receiver 212, etc. The position sensor(s) may be contact sensors, sensors configured to detect rotation or displacement, etc. The transaction circuit 300 may be communicably coupled to the position sensor(s). The transaction circuit 300 may monitor data generated by the position sensor(s) to identify a sequence of the locker door 204 opening and subsequently closing. When the locker door 204 opens and subsequently closes, the transaction circuit may determine that the good has been deposited in the locker 200.

When the transaction circuit 300 determines or identifies that the seller has deposited the good in the locker 200, the transaction circuit 300 may revoke the seller's access to the locker 200. The authentication device 102 may control the locking device 202 to lock the locker door 204 when the locker door 204 is closed. Thus, the seller's access to the locker 200 is revoked following the seller depositing the good in the locker 200. The seller may regain access to the good if, for instance, the buyer rejects the good.

Once the access to the seller is revoked, the transaction circuit 300 may provide access to another party. In some embodiments, the transaction circuit 300 may provide access to the buyer. In other embodiments, the transaction circuit 300 may provide access to a third party. Where the request indicates that a third party will receive access to the locker 200 to verify one or more aspects of the good. For instance, the third party may appraise the good, verify the good in the locker 200 fits the description of the good to be exchanged, verify the condition of the good, etc. In some embodiments, the third party may be indicated within the request (e.g., an identification of the third-party may be provided to the locker control system 100 in the request similar to the identification of the buyer and seller). In other embodiments, the request may include a request for a third party. In this embodiment, the locker control system 100 may maintain a database including identifications of various third parties, their schedules, their expertise, etc. The locker control system 100 may identify and reserve a third party for the transaction based on the third party's schedule, expertise, etc.

In some embodiments, the locker 200 may include one or more sensors used for identifying the contents deposited in the locker 200. For instance, the locker 200 may include cameras (e.g., camera 214) used for identifying the contents of the locker 200. As another example, the locker may include chemical agent sensors, intracavity laser spectroscopy (ILS) sensors, high frequency scanning sensors, and/or other sensors designed or configured to detect or identify contents. The sensor(s) may be configured to detect specific content, such as contraband (e.g., illegal, dangerous, etc. substances or devices, such as weapons, explosives or explosive material, drugs, and so forth). The transaction circuit 300 may analyze data generated by such sensors to determine whether the contents of the locker 200 are contraband. The transaction circuit 300 may include or access a database or other data structure or data store which stores sensor data profile(s) corresponding to various contraband. The transaction circuit 300 may determine, based on a comparison of the sensor data profiles from the database to sensor data captured by the sensors for identifying the contents, that the locker 200 contains contraband.

In embodiments where the transaction circuit 300 identifies or detects contraband in the locker 200, the transaction circuit 300 may generate a notification to a third party (e.g., the police or other authorities). The transaction circuit 300 may provide locker 200 access to the third party so that the contraband can be secured and safely removed from the locker 200.

In each of these embodiments, the transaction circuit 300 may provide locker 200 access to the third party or the buyer. The transaction circuit 300 may modify the transaction information maintained for the transaction to reflect the change in access. The transaction circuit 300 may generate a notification to the third party or buyer indicating they have access to the locker 200. The third party or buyer may go to the locker 200. The third party and/or buyer may authenticate themselves using one or more of the methods described above with reference to authenticating the seller (e.g., via providing their institution or third-party log-in information, providing their one-time passcode, swiping or inserting their ATM/credit/debit card, tapping their mobile device on the authentication device 102, etc.).

In embodiments where a third party is given access to, for instance, appraise the good or verify one or more other aspects of the good, the third party may provide the results of their evaluation to the locker control system 100. For instance, the third party may provide the results to the authentication device 102, which communicates those results to the communications device(s) 104. The third party may also provide the results to a user device which is communicably coupled to the communications device(s) 104. In either embodiment, the third party may provide their results to the locker control system 100. The transaction circuit 300 may update or modify the transaction data maintained for the transaction to reflect the results from the third party, as shown. The third party may also provide their results to the buyer and/or seller. Once the third party provides their results to the locker control system 100 and/or to the buyer/seller, the transaction circuit 300 may revoke the third party's access to the locker 200. The authentication device 102 may control the locking device 202 to lock the locker door 204 when the locker door 204 is closed. The transaction circuit 300 may provide the buyer access following the third party verifying the one or more aspects of the good (e.g., appraisal, matching description, condition, etc.).

The transaction circuit 300 may modify the transaction information maintained for the transaction to reflect the change in access from the third party to the buyer. The transaction circuit 300 may generate a notification to the buyer indicating they have access to the locker 200. The buyer may go to the locker 200. The buyer may authenticate themselves using one or more of the methods described above with reference to authenticating the seller (e.g., via providing their institution or third-party log-in information, providing their one-time passcode, swiping or inserting their ATM/credit/debit card, tapping their mobile device on the authentication device 102, etc.).

The buyer may inspect and accept (or reject) the good in the locker 200's storage space 208. The buyer may accept the good expressly by indicating acceptance on the authorization device 102 or a user device (such as the buyer's mobile device). Such express acceptance may be communicated from the authorization device 102 or user device to the locker control system 100. The buyer may accept the good by taking the good from the locker 200's storage space 208. Where the buyer accepts the good by taking the good from the locker 200, the transaction circuit 304 may detect the acceptance by taking the good in a manner similar to the transaction circuit 304 detecting the seller depositing the good (e.g., weight sensor(s), the camera 214, etc.).

While described herein as both the buyer and seller being authenticated, in some embodiments, one party to the transaction may not be authenticated. For instance, according to some embodiments, only the buyer is authenticated. The seller may arrive at a locker bank 500, select a suitable locker 200, place the good in the locker 200, and provide an indication (e.g., via the authentication device 102, to a user device/mobile device, etc.) to the locker control system 100 to indicate which locker 200 the seller used. In this example, the buyer (and third party) may be authenticated, rather than the seller, third-party, and buyer. Accordingly, the present disclosure is not limited to all parties to the transaction being authenticated. Rather, the present disclosure contemplates instances and examples where only the buyer is authenticated.

The locker control system 100 may include an escrow circuit 306. The escrow circuit 306 may perform various functions corresponding to transferring funds from the buyer to the seller. The escrow circuit 306 may identify account information for the buyer 314 and account information for the seller 316. Such information may be reflected in the transaction information maintained by the transaction circuit 300. The escrow circuit 306 may include one or more application programming interfaces (API)s associated with various financial institutions. The APIs may provide for the ability to initiate transfers of funds between accounts of various financial institutions. In some embodiments, the account used for transferring funds from the buyer to the seller may be the same account used for authenticating the buyer and/or seller. For instance, where the buyer authenticates using financial institution log-in information, the account associated with the buyer at the financial institution may be used by the escrow circuit 306. Also, where the buyer authenticates using an ATM/credit/debit card, the account associated with the ATM/credit/debit card may be used by the escrow circuit 306. In other embodiments, the buyer and/or seller may indicate or provide account information to be used for transferring funds, which may be different than accounts associated with authenticating the buyer and/or seller.

In some embodiments, the escrow circuit 306 may communicate with the financial institution associated with the account for the buyer. The escrow circuit 306 may communicate with the financial institution for the buyer via the corresponding API. The escrow circuit 306 may provide the buyer account information 314 and transaction amount to the financial institution. The escrow circuit 306 may also provide an account and routing number corresponding to the seller to the financial institution associated with the buyer. The escrow circuit 306 may also provide instructions to initiate the transfer of funds (according to the transaction amount) from the account associated with the buyer to the account associated with the seller.

The locker control system 100 may include a blockchain circuit 308. The blockchain circuit 308 may perform various functions for tracking and maintaining various records corresponding to the good exchanged from the seller to the buyer. For instance, the blockchain circuit 308 may generate a blockchain for the good. A blockchain may be a list of records (e.g., blocks) which are cryptographically linked together. The blockchain may be a public blockchain (e.g., accessible by the public) or a private blockchain. Each block may contain a cryptographic hash of the previous block, a timestamp, and transaction data (or other data). Thus, the blockchain may operate as a ledger for the good and track various transactions or other events corresponding to the good. The blockchain circuit 308 may build the blockchain whenever events for the good occur. Such events may include, for instance, ownership transfers, appraisal, etc. Thus, the blockchain circuit 308 may be used for verifying chain of title and/or other aspects of the good.

Figure 6:
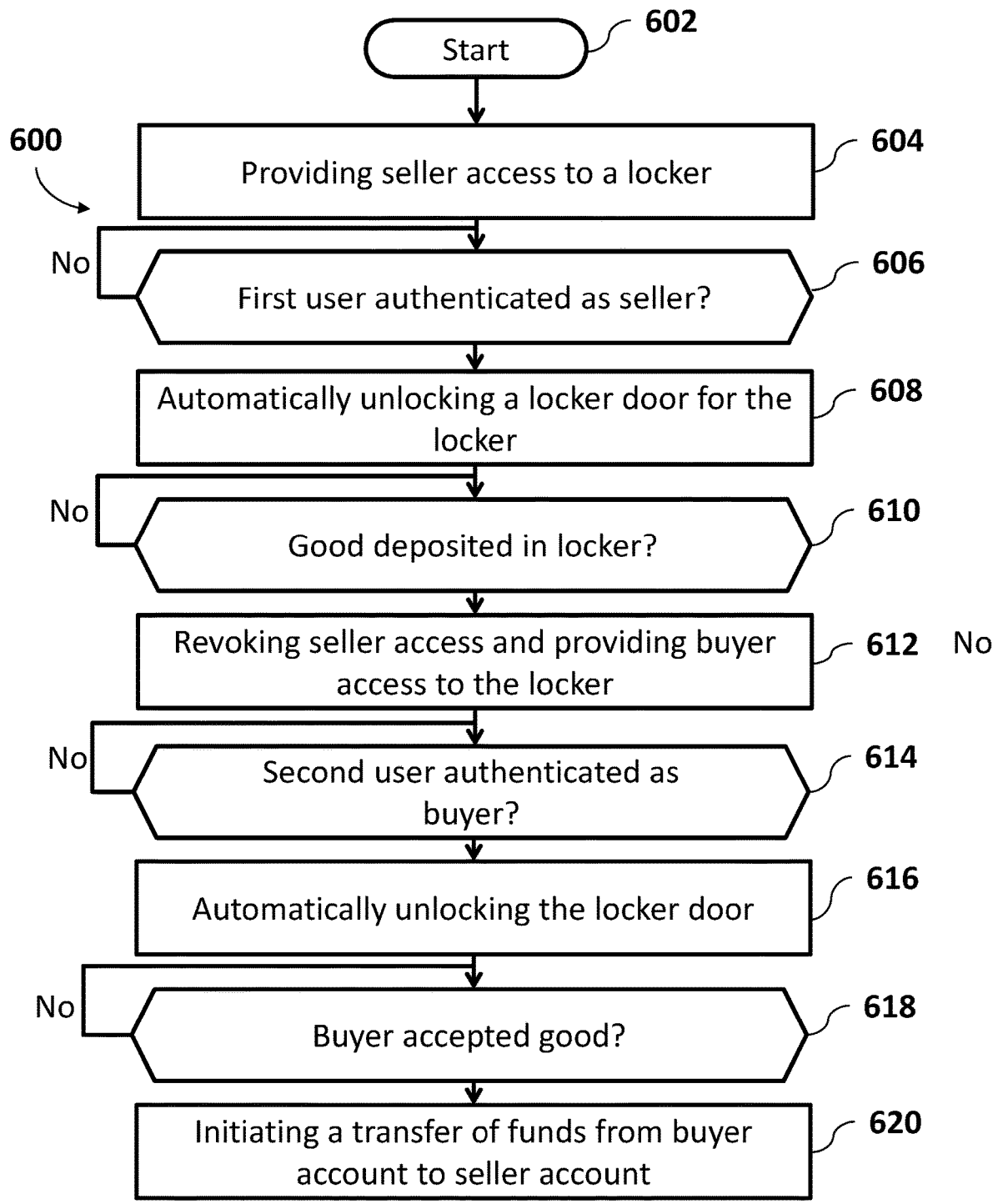
FIG. 6 shows a flow chart depicting an example method of executing a transaction via a locker, according to an exemplary embodiment.

Now that various aspects of the disclosed systems and components have been described, a method of executing a transaction via a locker will be described with reference to FIG. 6. The flow chart shown in FIG. 6 provides only one example of executing a transaction via a locker. Accordingly, the following disclosure should not be limited to each and every operation shown in FIG. 6. To the contrary, the method does not require each and every operation shown in FIG. 6. In some examples, the method may include additional operations. Further, the method does not need to be performed in the same chronological order shown in FIG. 6.

Referring to FIG. 6, shown is a flow chart depicting an example method 600 of executing a transaction via a locker, according to an exemplary embodiment. The method 600 may include a starting block 602.

At the starting block 602, the method 600 may begin. In some embodiments, the method 600 may begin when a request is received (e.g., from the application 106 and/or marketplace 108). The method 600 may begin when a locker 200 is selected for use by the buyer and seller for conducting the exchange. The method 600 may proceed to operation 604.

At operation 604, the transaction circuit 300 may provide the seller access (e.g., the ability to access following proper authentication, as described below) to the locker 200. The transaction circuit 300 may provide the seller access to the locker 200 responsive to identify and reserving the locker 200 for conducting the exchange. Thus, the seller may be the first party who is provided access to the locker 200. The transaction circuit 300 may reflect the current access status in the transaction information maintained by the transaction circuit 300. The transaction circuit 300 may generate a notification to communicate to the seller indicating the seller has access to the locker 200. The seller may arrive at the location of the locker 200. The method 600 may proceed to operation 606.

At operation 606, the authentication device 102 may authenticate a first user as the seller. The first user may provide authentication information to the authentication device 102. The authentication circuit 304 may cross-reference the authentication information provided by the first user to authentication information corresponding to the seller. The authentication information may be or include institution log-in information, third-party log-in information, data corresponding to an ATM/credit/debit card, data from a mobile device for the first user, and/or a one-time pass code. The authentication circuit 304 may compare the authentication information provided by the first user to the authentication information for the seller. In some embodiments, the seller may provide, prior to arriving at the location of the locker 200, the manner in which the seller plans to authenticate themselves. Where the authentication information provided by the first user and the authentication information for the seller matches, the authentication circuit 304 may authenticate the user as the seller. In embodiments where the seller provides the manner in which the seller is planning to authenticate themselves, the authentication circuit may identify the seller identification information for the seller corresponding to the manner in which the seller plans to authenticate themselves. As one example, where the seller plans to authenticate themselves via social medial log-in information, the authentication circuit may identify the social media log-in information for the seller prior to (or when) the seller arrives at the location for the locker 200. The authentication circuit may then compare the social media log-in information to the authentication information provided by the first user. Even where the first user provides information which could be used for authenticating the first user as a buyer, if the first use does not use the social media log-in information identified by the seller, the first user may not be authenticated. Such embodiments provide an additional layer of security. Where the first user is not properly authenticated, the method 600 may loop at operation 606 (e.g., until a user is properly authenticated as the seller). When a user is authenticated as the seller, the method 600 may proceed to operation 608.

At operation 608, the authentication device 102 may automatically unlock the locker door 204 for the locker 200. The authentication device 102 may control the locking device 202 for the locker 200 to unlock the locker door 204 for the locker 200. The authentication device 102 may automatically unlock the locker door 204 responsive to the first user being authenticated as the seller. The first user (e.g., the seller) may thus be provided access to the storage space 208 for the locker 200. The method 600 may proceed to operation 610.

At operation 610, the transaction circuit 300 may detect the seller deposited the good in the locker 200. The locker 200 may include, for instance, camera(s) 214, weight sensor(s), position sensor(s), etc. The transaction circuit 300 may be communicably coupled to the camera(s) 214, weight sensor(s), position sensor(s), etc. The transaction circuit 300 may analyze data from the sensor(s) to determine whether the seller deposited the good in the locker. Where a camera 214 is included in the locker 200 or otherwise configured to generate image data corresponding to the storage space 208 for the locker 200, the transaction circuit 300 may detect that the seller deposited the good in the locker 200 based on images generated by the camera 214 showing an object located in the storage space 208. Where the weight sensor(s) are included in the locker 200, the transaction circuit 300 may detect that the seller deposited the good in the locker 200 based on added weight inside the locker as detected by the weight sensor(s) and reflected in corresponding sensor data. Where position sensor(s) are included in the locker 200, the transaction circuit 300 may detect that the seller deposited the good in the locker 200 based on a detected sequence of the locker door 204 being opened and subsequently closed. Where the good is not determined to be deposited in the locker 200, the method 600 may loop at operation 610 (e.g., until the good is deposited in the locker 200). When the good is deposited in the locker 200, the method 600 may proceed to operation 612.

At operation 612, the transaction circuit 300 may revoke the seller's access to the locker 200 and provide access to the buyer. The transaction circuit 300 may modify and/or update transaction information corresponding to the transaction to reflect the change in access. The transaction circuit 300 may generate a notification to the buyer indicating the buyer has access to the locker 200. The buyer may arrive at the locker 200. The method may proceed to operation 614-616, which may be similar to operations 606-608. For instance, a second user may be authenticated as the buyer in a manner similar to the first user being authenticated as the seller (e.g., similar to the discussion of operation 606). When the buyer is authenticated, the locker door may automatically be unlocked (e.g., similar to the discussion of operation 608). From operation 616 (e.g., automatically unlocking the locker door 204), the method 600 may proceed to operation 618.

At operation 618, the transaction circuit 300 may determine that the buyer accepted the good from the locker 200. In some embodiments, the buyer may expressly accept the good from the locker 200 (e.g., by providing such express acceptance to the authorization device 102, user device, etc., which is communicated to the transaction circuit 300). In other embodiments, the buyer may accept the good by taking it from the locker 200. In these embodiments, the acceptance may be detected in a manner similar to detecting the seller deposited the good in the locker 200 (e.g., camera 214 or weight sensor(s) detect the locker 200 is now empty). When the transaction circuit 300 determines the buyer accepted the good from the locker 200, the method 600 may proceed to operation 620.

At operation 620, the escrow circuit 306 may initiate a transfer of funds from an account associated with the buyer to an account associated with the seller. In some embodiments, the account(s) may correspond to the information provided by the buyer/seller for authenticating the buyer/seller. In other embodiments, the account(s) may be indicated by the buyer/seller. The escrow circuit 306 may communicate with an API for the institution associated with the account for the buyer. The escrow circuit 306 may communicate account information associated with the buyer, an amount of funds to transfer, and an account and routing number for the seller. The escrow circuit 306 may cause the funds to be transferred from the account for the buyer to the account for the seller responsive to the buyer accepting the goods.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 108(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), a distributed ledger (e.g., a blockchain), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Ethereum, Ripple, Litecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments.

Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X, Y, Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes, and omissions may be made in the design, operating conditions and arrangement of the embodiments without departing from the scope of the present disclosure as expressed in the appended claims.

What is claimed is:

1. A method of executing a transaction via a locker, the method comprising:
   receiving, by a processing circuit of a locker control system, from a computing device corresponding to a buyer or a seller, data corresponding to a transaction between the buyer and the seller, the data comprising a user request for a locker, data corresponding to an account of the buyer, data corresponding to an account of the seller, and an amount to be transferred responsive to determining that the buyer accepted a good;
   receiving, by the processing circuit, first user authentication information;
   matching, by the processing circuit, the first user authentication information with the data corresponding to the account of the seller;
   sending, by the processing circuit, a first unlock control signal to a locking device of the locker;
   detecting, by the processing circuit, that the seller deposited the good in the locker;
   responsive to detecting the seller deposited the good in the locker, sending, by the processing circuit, a lock control signal to the locking device;
   receiving, by the processing circuit, second user authentication information;
   matching, by the processing circuit, the second user authentication information with the data corresponding to the account of the buyer;
   responsive to identifying the second user, sending, by the processing circuit, a second unlock control signal to the locking device;
   determining, by the processing circuit, that the buyer removed and accepted the good from the locker; and
   responsive to determining the buyer removed and accepted the good from the locker, automatically initiating, by the processing circuit, a transfer of funds from the account associated with the buyer to the account associated with the seller.

2. The method of claim 1, further comprising:
   identifying, by the processing circuit, based on the transaction, the good to be transferred from the seller to the buyer;
   receiving by the processing circuit, image data from a camera; and
   verifying, by the processing circuit, based on the image data, the good deposited in the locker by the seller is the identified good to be transferred.

3. The method of claim 1, further comprising:
   providing, to a third party, access to the locker for verifying one or more aspects of the good by:
   receiving, by the processing circuit, third user authentication information from an authentication computing device;
   matching, by the processing circuit, the third user authentication information with data corresponding to the third party;
   sending, by the processing circuit, a third unlock control signal to the locking device;
   detecting, by the processing circuit, that the third party has verified the one or more aspects of the good; and
   responsive to detecting that the third-party has verified the one or more aspects of the good, sending, by the processing circuit, a second lock control signal to the locking device.

4. The method of claim 3, wherein at least one of the one or more aspects comprises an appraisal of the good.

5. The method of claim 1, wherein the first user authentication information is received from a first authentication computing device.

6. The method of claim 1, wherein detecting that the seller deposited the good in the locker comprises:
   receiving, by the processing circuit, image data from a camera arranged to capture images from inside the locker; and
   determining, by the processing circuit, that the seller deposited the good in the locker by matching the image data with an image of the good.

7. The method of claim 1, wherein the first user authentication information comprises at least one of:
   institution log-in information corresponding to the seller;
   third party log-in information corresponding to the seller;
   data from a mobile device corresponding to the seller;
   a one-time pass code corresponding to the seller; and
   data associated with a debit card, credit card, or an automated teller machine (ATM) card for the seller.

8. The method of claim 1, wherein identifying the second user further comprises:
   transmitting, by the processing circuit, a notification to a device associated with the buyer, the notification indicating the buyer has access to the locker; and
   identifying, by the processing circuit, the second user authentication information to be used for authenticating the buyer at the locker.

9. The method of claim 8, wherein receiving the second user authentication information comprises:
- receiving, by the processing circuit from a device of the buyer, an identification of a type of authentication for authenticating the buyer at the locker; and
- identifying, by the processing circuit, the second user authentication information corresponding to the type of authentication.

10. The method of claim 9, wherein matching the second user authentication information with the data corresponding to the account of the buyer comprises:
- receiving, by an authentication computing device, the second user authentication information provided by the second user;
- comparing the second user authentication information provided by the second user to the buyer identification information identified for the buyer corresponding to the type of authentication to be used for authenticating the buyer; and
- authenticating, by the authentication computing device, the second user as the buyer responsive to the buyer identification information provided by the second user and the buyer identification information for the buyer matching.

11. A system for executing a transaction via a locker comprising:
- a locker having a storage space that stores a good to be transferred from a seller to a buyer and a locker door that secures the storage space;
- a locking device that locks or unlocks the locker door;
- one or more processors; and
- memory storing instructions that, when executed by the one or more processors, cause the one or more processors to perform the steps of:
  - receiving, from a computing device corresponding to the seller or the buyer, data corresponding to a transaction between the buyer and the seller, the data comprising a user request for the locker, data corresponding to an account of the seller, and an amount to be transferred responsive to determining that the buyer accepted the good;
  - receiving first user authentication information;
  - matching the first user authentication information with the data corresponding to the account of the seller;
  - sending a first unlock control signal to the locking device of the locker;
  - detecting that the seller deposited the good in the storage space for the locker;
  - sending, responsive to detecting the seller deposited the good in the storage space for the locker, a lock control signal to the locking device, and
  - receiving second user authentication information;
  - matching the second user authentication information with the data corresponding to an account of the buyer;
  - sending, responsive to identifying the second user, a second unlock control signal to the locking device;
  - determining that the buyer removed and accepted the good from the locker; and
  - communicating, responsive to determining that the buyer removed and accepted the good from the locker, a signal to a financial institution to transfer the amount of funds from the account of the buyer to the account of the seller.

12. The system of claim 11, wherein the instructions, when executed by the one or more processors, further cause the one or more processors to perform the steps of:
- identifying, based on the transaction, the good to be transferred from the seller to the buyer;
- receiving image data from a camera; and
- verifying the good deposited in the locker by the seller is the identified good to be transferred by matching the image data with an image of the good.

13. The system of claim 11, wherein the instructions, when executed by the one or more processors, further cause the one or more processors to perform the step of providing, to a third party, access to the locker for verifying one or more aspects of the good by:
- receiving third user authentication information;
- matching the third user authentication information with data corresponding to the third party;
- sending a third unlock control signal to the locking device
- detecting that the third party has verified the one or more aspects of the good; and
- responsive to detecting that the third-party has verified the one or more aspects of the good, sending a second lock control signal to the locking device.

14. The system of claim 13, wherein at least one of the one or more aspects comprises an appraisal of the good.

15. The system of claim 11, wherein the step of receiving the first user authentication information further comprises:
- receiving the first user authentication information from a first authentication computing device.

16. The system of claim 11, further comprising:
- a camera arranged to capture image data inside the locker, wherein the step of detecting that the seller deposited the good in the storage space for the locker further comprises:
  - detecting that the seller deposited the good in the locker by matching the image data with an image of the good captured by the camera.

17. The system of claim 11, wherein the first user authentication information comprises at least one of:
- institution log-in information corresponding to the seller;
- third party log-in information corresponding to the seller;
- data from the computing device corresponding to the seller;
- a one-time pass code corresponding to the seller; and
- data associated with a debit card, credit card, or an automated teller machine (ATM) card for the seller.

18. The system of claim 11, wherein the instructions, when executed by the one or more processors, cause the one or more processors to perform the steps of:
- transmitting a notification that the buyer has access to the locker to the computing device corresponding to the buyer responsive to sending the second unlock control signal.

19. The system of claim 18, wherein the step of matching the second user authentication information with the data corresponding to the account of the buyer comprises:
- receiving, from the computing device corresponding to the buyer, an identification of a type of authentication for authenticating the buyer at the locker; and
- identifying the second user authentication information corresponding to the type of authentication for authenticating the buyer at the locker.

20. The system of claim 19, wherein the step of matching the second user authentication information with the data corresponding to the account of the buyer further comprises:
- receiving, via an authentication computing device, the second user authentication information from the second user;
- comparing the second user authentication information from the second user to the identified second user authentication information corresponding to the type of authentication to be used for authenticating the buyer; and authenticating the second user as the buyer responsive to the buyer identification information from the second user and the buyer identification information for the buyer matching.

\* \* \* \* \*